No. 654,441. Patented July 24, 1900.
W. H. COOK.
MACHINE FOR MEASURING LIQUIDS.
(Application filed Apr. 7, 1900.)

(No Model.)

Witnesses.
Robert Everitt,

Inventor.
Walter H. Cook,
By James L. Norris
Atty.

THE NORRIS PETERS CO., PHOTO-LITHO., WASHINGTON, D. C.

UNITED STATES PATENT OFFICE.

WALTER H. COOK, OF NEW ORLEANS, LOUISIANA.

MACHINE FOR MEASURING LIQUIDS.

SPECIFICATION forming part of Letters Patent No. 654,441, dated July 24, 1900.

Application filed April 7, 1900. Serial No. 11,990. (No model.)

*To all whom it may concern:*

Be it known that I, WALTER H. COOK, a citizen of the United States, residing at New Orleans, in the parish of Orleans and State of Louisiana, have invented new and useful Improvements in Machines for Measuring Liquids, of which the following is a specification.

It is the purpose of my invention to provide simple and accurate automatic mechanism for measuring liquids which shall be capable of operating continuously to draw off a body of fluid in a closed vessel and discharge it into any suitable receiver, the withdrawal being made in equal quantities of predetermined cubic volume.

It is a further purpose of my invention to provide a recording device adapted to be operated by each single and complete action of the measuring mechanism, whereby the whole number of times the latter has been filled and emptied will be registered, whereby the cubic capacity of the apparatus being known the measurement of the whole body of liquid drawn off can be ascertained by multiplying this cubic capacity by the figure last recorded by the register.

My invention also comprises other novel and useful features, which will be fully explained in the following specification and then particularly pointed out and defined in the claims.

For the purposes of the ensuing description reference will be had to the accompanying drawings, in which—

Figure 1:
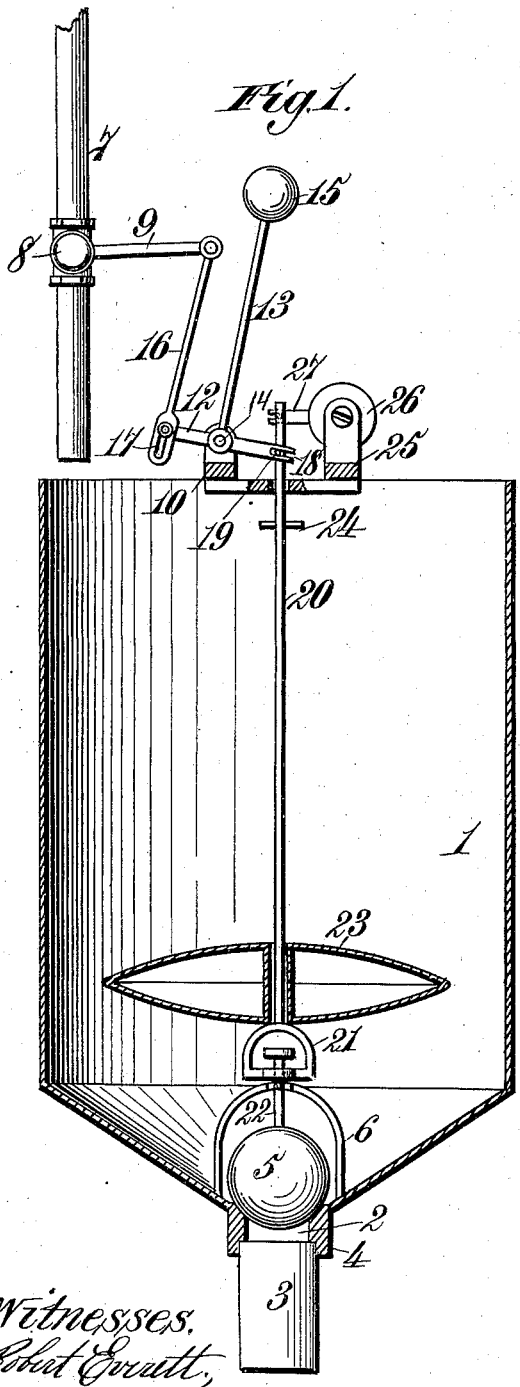
Figure 2:
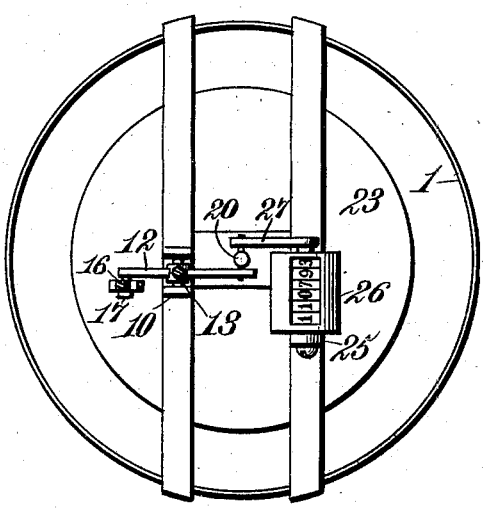

Figure 1 is a vertical central section showing an apparatus embodying my said invention in readiness for operation. Fig. 2 is a plan view of the same.

The reference-numeral 1 in said drawings indicates a fixed reservoir or receiver of any required capacity, its lower end being preferably, though not necessarily, of funnel shape to aid the liquids in passing through the discharge-port 2. The apparatus being ordinarily fixed or immovable, the receiver 1 may be mounted or supported upon the end of a pipe 3, which enters a short neck 4, that drops somewhat below the funnel-shaped bottom and constitutes the discharge or draw-off. It is normally closed by an outlet-valve 5, which is retained in place by a valve-cage 6. Liquid is supplied to said reservoir or receiver by a pipe 7, the open or delivery end whereof stands just above said reservoir. The flow from this pipe is controlled by a feed-valve 8 of any suitable pattern, on the stem of which is mounted a lever-arm 9, the arrangement of the valve 8 being such that said lever-arm makes nearly a right angle with the vertical pipe 7, so that the said lever is nearly in horizontal position.

Upon any suitable support—such, for example, as a bracket 10 on the top of the receiver—is pivotally mounted a lever 12, having a rigid arm 13 rising at a right angle from it, said lever and arm being united at the pivotal point 14. The arm 13 is provided with a weight 15 at its upper end. One end of the bar 12 is connected to a link-bar 16, which is pivoted to the end of the lever-arm 9, the link-bar having a slot 17 in its lower end to receive the connection to the bar 12 and allow a certain amount of lost motion before the link-bar 16 will be caused to operate the lever-arm 9, by which the valve 8 is opened and closed. The other end of the lever-arm 12 is provided with a fork 18, the arms of which straddle a pin 19, projecting from a central vertical rod 20, the lower end of which is provided with a yoke 21, connecting it to the stem 22 of the outlet-valve 5. The stem rises above the cage 6 to engage said yoke, and the latter is arranged to have a certain degree of lost motion on the valve-stem before it exerts any pull thereon to unseat the valve. A float 23, movable on the rod 20, is limited in its movement thereon by the yoke 21 below and by a cross-pin 24, passed through the rod 20, near its upper end.

The operation is as follows: A proper receptacle having been provided to receive the liquid passing through the measuring apparatus, the receiver 1 is filled from the pipe 7, the valve 8 therein being opened and while the outlet-valve at the outlet of the reservoir 1 remains closed. As the reservoir fills the float 23 rises with the incoming liquid, and when the tank has been supplied therewith to its approximate containing capacity said float will engage the cross-pin 24 of the rod 20 and in its further upward movement will carry the pivotal connection to the link-bar 16 downward in the slot 17 and lift the yoke 21 on the stem 22 of the valve 5 into engagement with the upper end of said stem, thus opening said valve and allowing the passage of the liquid from said tank. These movements are effected by the tilting of the lever 12 on the bracket 10. This movement of said lever causes the arm 13 to move into a vertical position, when the weight 15 will be in line with the pivotal point 14, said arm then suddenly tilting under the action of the weight 15 past the point of equilibrium, whereupon it will complete the movement by its own gravity, unseating the valve 5 and at the same movement turning the lever-arm 9 and closing the inlet-valve 8 in the pipe 7. The liquid now flows from the reservoir 1 into the receptacle provided for it, the valve 5 being held open by the rod 20, which is retained in its vertical position by the weighted arm 13. As the float 23 moves down and rests again upon the yoke 21 the rod 20 is caused to move with it as the further discharge from the reservoir takes place until the arm 13 is tilted back far enough to carry the weight 15 beyond the line of equilibrium, whereupon it falls in a direction opposite to that last described, whereby the rod 20 is carried downward till its yoke 21 seats upon the cage 6, which permits the valve 5 to close on its seat, while the upward thrust upon the link-bar 16 turns the lever-arm 9 and opens the valve 8.

A hand-actuated cock of usual construction (not shown) is supplied in practice to the pipe 7, above the feed-valve 8, to provide for cutting off the feeding of the liquid as required.

Upon the bracket 25 or other support is placed a register 26, of any suitable type, its index-lever 27 having connection at its end with the upper end of the rod 20, so that each downward movement of said rod following the discharge of liquid from said reservoir will produce an operative movement of the said index-lever 27, and the dial of the register will thus show that the reservoir 1 has been filled and emptied. This enables the operation to be carried on without requiring the constant attendance of an operator, whose presence is only necessary when the apparatus is to be stopped or when a receptacle is needed to receive the liquid discharged from the reservoir 1.

The mechanism is extremely simple in construction, has very few parts, cannot easily become disordered or require repair, and can be manufactured at a very small expense, comparatively speaking. It is automatic throughout and capable of a high degree of accuracy and can be constructed upon any scale of capacity required.

Having described my invention, what I claim as new, and desire to secure by Letters Patent of the United States, is—

1. A liquid-measuring apparatus, consisting of a fixed reservoir, an outlet-valve to open and close a discharge-port in the lower end of said reservoir, a pipe to supply fluid to the latter, a feed-valve in said pipe, a weighted lever having a loose link connection with a lever-arm on the stem of said feed-valve, a vertically-movable rod having one end loosely connected to the stem of the valve in the discharge-opening, and a float movable upon the vertically-movable rod, said rod having a cross-pin or stop fixed thereto, engaged by said float when nearing the limit of its upward movement, to effect the movement of said rod to open said outlet-valve, substantially as described.

2. In a liquid-measuring apparatus, the combination with a fixed reservoir, of an outlet-valve to open and close a discharge-port in the bottom of said reservoir, a pipe to supply liquid to the same, an inlet-valve in said pipe having a lever-arm on its stem, a vertically-movable rod having a yoke loosely connected to the stem of the outlet-valve to slide thereon, a lever-arm connected at one end to said rod and at the other end loosely connected to the lever-arm on the stem of the inlet-valve by a link, a weighted arm moving with said lever-arm over the pivotal point of support of the latter, and a float movable upon the vertically-movable rod between the yoke on its lower end and a stop near the upper end, substantially as described.

3. In a liquid-measuring apparatus, the combination with a fixed reservoir of an inlet pipe and valve, to supply liquid to the reservoir, a lever-arm having one end provided with a sliding link connection to an arm on the stem of the inlet-valve, a rod vertically movable in the reservoir and having a stop or cross-pin fixed thereto, near the upper end of said reservoir and connected to the other end of said lever-arm, an outlet-valve in the bottom of the reservoir its stem having a sliding connection with a yoke on said rod, a float movable on the latter with the rise and fall of liquid in said reservoir, and an arm rigid with the lever-arm and carrying a weight back and forth above the point of pivotal support of the latter, substantially as described.

4. In a liquid-measuring apparatus, the combination with a fixed reservoir, of an outlet-valve therein, an inlet-pipe having an inlet-valve, a vertically-movable rod having a sliding connection to the stems of both valves and a cross-pin or stop fixed thereto, near the upper end of said reservoir, a float movable on the rod, a register having its index-lever connected to said rod, a lever-arm connected at one end to said rod and linked at its other end to an arm on the stem of the inlet-valve, and a weighted arm rigid with and carrying its weight back and forth above the pivotal support of the lever-arm, substantially as described.

In testimony whereof I have hereunto set my hand in presence of two subscribing witnesses.

WALTER H. COOK.

Witnesses:
PORTER PARKER,
GABRIEL H. FUSELIER.